(12) United States Patent
Fisher et al.

(10) Patent No.: US 7,596,510 B2
(45) Date of Patent: *Sep. 29, 2009

(54) METHOD, SYSTEM AND APPARATUS FOR REQUESTING STATUS INFORMATION FROM A COMMON CARRIER

(75) Inventors: Alan S. Fisher, Pleasanton, CA (US); Samuel Jerrold Kaplan, Hillsborough, CA (US)

(73) Assignee: eBay Inc., San Jose, CA (US)

( * ) Notice: Subject to any disclaimer, the term of this patent is extended or adjusted under 35 U.S.C. 154(b) by 1131 days.

This patent is subject to a terminal disclaimer.

(21) Appl. No.: 10/371,274

(22) Filed: Feb. 14, 2003

(65) Prior Publication Data

US 2003/0139977 A1    Jul. 24, 2003

Related U.S. Application Data

(63) Continuation of application No. 09/426,573, filed on Oct. 25, 1999, now Pat. No. 7,139,726, which is a continuation of application No. 08/725,635, filed on Oct. 8, 1996, now Pat. No. 6,047,264, which is a continuation-in-part of application No. 08/695,095, filed on Aug. 8, 1996, now abandoned.

(51) Int. Cl.
 *G06F 30/00* (2006.01)
(52) U.S. Cl. ...................................... 705/26
(58) Field of Classification Search .......... 705/26, 705/27
 See application file for complete search history.

(56) References Cited

U.S. PATENT DOCUMENTS

| | | | |
|---|---|---|---|
| 4,554,418 A | 11/1985 | Toy | |
| 4,766,542 A | 8/1988 | Pilarczyk | |
| 4,799,156 A | 1/1989 | Shavit et al. | |
| 4,975,841 A | * 12/1990 | Kehnemuyi et al. | 705/32 |
| 5,235,680 A | 8/1993 | Bijnagte | |
| 5,265,006 A | 11/1993 | Asthana et al. | |
| 5,283,731 A | 2/1994 | Lalonde et al. | |
| 5,311,438 A | 5/1994 | Sellers et al. | |
| 5,313,051 A | 5/1994 | Brigida et al. | |

(Continued)

FOREIGN PATENT DOCUMENTS

CA         2156907         9/1994

(Continued)

OTHER PUBLICATIONS

Businesswire, "FedEx Ship Delivers Shipping to the Desktop; FedEx Forms Marketing and Distribution Agreements with IBM, Apple, Intuit, America Online and CommerceNet" Nov. 4, 1994.*

(Continued)

*Primary Examiner*—Mark Fadok
(74) *Attorney, Agent, or Firm*—Schwegman, Lundberg, Woessner, P.A.

(57) ABSTRACT

A method and system for automatically requesting transit status information from a common carrier system over a network. The transit status information indicates a transit status of an item purchased by a customer by placing an order. A message is automatically composed and transmitted to the customer upon determining the transit status of the item purchased by the customer has changed.

27 Claims, 5 Drawing Sheets

U.S. PATENT DOCUMENTS

| | | | |
|---|---|---|---|
| 5,317,683 A | 5/1994 | Hager et al. | |
| 5,428,778 A | 6/1995 | Brookes | |
| 5,485,369 A | 1/1996 | Nicholls et al. | |
| 5,487,100 A | 1/1996 | Kane | |
| 5,508,817 A | 4/1996 | Kunigami | |
| 5,548,753 A | 8/1996 | Linstead et al. | |
| 5,627,764 A | 5/1997 | Schutzman et al. | |
| 5,630,073 A | 5/1997 | Nolan | |
| 5,664,115 A | 9/1997 | Fraser | |
| 5,694,546 A | 12/1997 | Reisman | |
| 5,710,887 A | 1/1998 | Chelliah et al. | |
| 5,794,789 A * | 8/1998 | Payson et al. | 209/549 |
| 5,797,133 A | 8/1998 | Jones et al. | |
| 5,870,717 A * | 2/1999 | Wiecha | 705/26 |
| 5,960,408 A | 9/1999 | Martin et al. | |
| 6,047,264 A * | 4/2000 | Fisher et al. | 705/26 |
| 6,151,582 A | 11/2000 | Huang et al. | |
| 6,151,643 A * | 11/2000 | Cheng et al. | 710/36 |
| 6,285,916 B1 | 9/2001 | Kadaba et al. | |
| 6,859,787 B2 * | 2/2005 | Fisher et al. | 705/26 |
| 7,110,954 B2 | 9/2006 | Yung et al. | |
| 7,130,818 B2 * | 10/2006 | Fisher et al. | 705/26 |
| 7,139,726 B2 * | 11/2006 | Fisher et al. | 705/26 |
| 2002/0099613 A1 | 7/2002 | Swart et al. | |
| 2002/0120533 A1 | 8/2002 | Wiesenmaier | |
| 2002/0128932 A1 | 9/2002 | Yung et al. | |
| 2003/0154134 A1 | 8/2003 | Wang | |
| 2005/0144035 A1 | 6/2005 | Fisher et al. | |
| 2005/0150951 A1 | 7/2005 | Sacco et al. | |

FOREIGN PATENT DOCUMENTS

| | | |
|---|---|---|
| CA | 2173166 A1 | 12/1996 |
| WO | WO-9613015 A2 | 5/1996 |

OTHER PUBLICATIONS

Towle, Henry, "On the Fast Track With TotalTrack: UPS Deploys Mobile Data Service," Document Delivery World, vol. 9, No. 9 (Apr./May 1993), pp. 30-31.

Robinson, Brian, "Windows-Based EC Front End Debuts, (MACA's Electronic Procurement System 4.0)" (Abstract) Federal Computer Week, vol. 8, No. 31, Oct. 24, 1994, p. 32.

Kennedy, Randall C., "Automatic Delivery For Interoffice Forms: JetForm for E-Mail 3.10" Windows Sources, vol. 1, No. 7, Aug. 1993, p. 154 (and cover pages).

Holmes, Bob, "The Development of Paperless Trading in Shipping," Online Publications, Electronic Data Interchange Conference, London, Apr. 1987, pp. 45-54 (and cover).

Payne, Judith E. et al., "Electronic Data Interchange (EDI) Using Electronic Commerce to Enhance Defense Logistics," R-4030-P&L, Rand, 1991, pp. 42-54 (and cover).

Srinivasan, !Kannan et al., "Impact of Electronic Data Interchange Technology on JIT Shipments," Management Science, vol. 40, No. 10, Oct. 1994, pp. 1291-1304.

Stecher, P. "Building Business and Application Systems with the Retail Application Architecture," IBM Systems Journal, vol. 32, No. 2, 1993, pp. 278-306.

Kaye, A. Roger et al., "A User Agent For Multiple Computer-Based Message Services," Computer-Based Message Services, Elsevier Science Publishers B.V., 1984, pp. 127-136.

Gold, Eric, "Envoys in Electronic Mail Systems," Association for Computing Machinery, 516015, Summer 1986, pp. 2-10.

Fanderl, H. et al., "The Open Document Architecture: From Standardization to the Market," IBM Systems Journal, vol. 31, No. 4, 1992, pp. 728-753.

Moore, R.E., "Utilizing the SNA Alert in the Management of Multivendor Networks," IBM Systems Journal, vol. 27, No. 1, 1988, pp. 15-30.

Croft, W. Bruce and Lefkowitz, Lawrence S., "Task Support in An Office System," ACM Transactions on Office Information Systems, vol. 2, No. 3, Jul. 1984, pp. 197-212.

Rockoff, Maxine L. And Malone, Rich, "Distributed Brokerage Offices Through Information Technology," ACM Conference on Organizational Computing Systems, 1991, pp. 165-170.

Steel, Ken "The Standardisation of Flexible EDI Messages," Chapter 3, Electronic Commerce, Current Research Issues and Applications, Nov. 24, 1994, pp. 13-26 (and cover).

Wilson, Paul, "Structures for Mailbox System Applications," Computer-Based Message Services, Elsevier Science Publishers B.V., 1984, pp. 149-165.

Jacobs, April, "Oil Change Gives Automatic Software Tune-Ups," Computerworld May 27, 1996, p. 29.

Nash, Kim S. and Picarille, Lisa, "Vendors Deliver IS-Specific Apps Over the 'Net," Computerworld, May 6, 1996, p. 16.

Cox, John, "Middleware Product to Manage Transactions Over the Network," Network World, Feb. 26, 1996, pp. 29-30.

Chabrow, Eric R., "Data Is Part of the Package," IW, Dec. 25, 1995, pp. 43-44.

Rhine, Lenny and Brown, Byron Ladd II, "Journal Claiming Via Electronic Mail," Computers in Libraries, Jun. 1989, p. 34.

Kadaba, Nagesh et al. "Multi-Stage Parcel Tracking System" (Abstract), WO 96/13015, PCT Gazette Section 1, No. 20 (1996), p. 7860.

Kunigami, Toshio, "Electronic Mail Accounting System," U.S. Appl. No. 5,508,817, Official Gazette of the U.S. Patent and Trademark Office, Apr. 16, 1996, p. 2139.

PR Newswire Article, "FedEx Ship Delivers Shipping to the Desktop," Nov. 2, 1994, 3 pages.

PR Newswire Article, "Beyond Text-Search: New System for Online Product Catalogs Enables Precise, Rapid Search, Comparison & Selection Via Product Attributes," May 6, 1996, 4 pages.

Boyd, Wallace, "Kodak Expands Businessland Outsourcing Pact," Computer Reseller News, No. 399 (1990), p. 88.

"Internet Watch: Advertising on the Internet Must be Useful or Entertaining If It Is To Win Over Its Audience," Marketing Week, vol. 18, No. 48, Mar. 1, 1996, p. 16.

Oberndorf, Shannon, "Online Transactions Come Full Circle," Catalog Age, vol. 13, No. 13, Dec. 1996, p. 10.

PR Newswire Aricle, "Dell Launches Internet Computer Store," Jul. 22, 1996, 3 pages.

M2 Presswire Article, "Intersolv's PVCS Tracker Helps Corporate UK Achieve More From Its Web Sites," Aug. 28, 1996, 3 pages.

Mc Kie, Stewart, "Internet-DBMS Strategies," DBMS, vol. 9, No. 11, Oct. 1996, pp. 44-46, 50 and 52 (and cover).

Helsinki, Paul, "Automating Web-Site Maintenance", Part 2, Perl-based tools to manage your Web site, Web Techniques, ISSN 1086-556XP002048313., (Dec. 1996), pp. 75-76, 78.

Search Report, "International Searching Authority", PCT/US 97/13567, (Jul. 31, 1997).

"Books-Best Sellers List", http://www.nytimes.com/pages/books/bestseller/, 3 pgs.

"Buzz Index Leaders Summary", http://buzz.yahoo.com/, 2 Pages.

"Electronic Mail Accounting System", Electrical Patent 5,508,817 (unknown), (Apr. 16, 1996), 2139.

"Games Half.com Most Wanted", http://half.ebay.com/products/most_wanted.cfm?tag=games, 3 Pages.

"Google Zeitgeist—Search patterns, trends, and surprises according to Google", http://www.google.com/press/zeitgeist.html, 7 Pages.

"Multi-Stage Parcel Tracking System", WO 96-13015A2 PCT Gazette—Section I, No. 20/1996, 7860.

"Oceanside—See What's Selling", http://www.amazon.com/exec/obidos/tg/browse/-/216306/102-84..., 4 Pages.

"Purchase Circles", http://www.amazon.com/exec/obidos/subst/community/community..., 2 Pages.

"The Billboard Hot 100", http://www.billboard.com/bb/charts/hot100.jsp, 4 pgs.

"The O.C. Party", http://50Iycos.com/, 3 Pages.

"Today's Top 20 Overall Searches", http://buzz.yahoo.com/overall, 2 Pages.

PCT/US97/13567, "PCT Notification of Transmittal of the International Search Report or the Declaration", PCT/US97/13567.

Saeki, Motoshi et al., "Supporting Distributed Individual Work In Cooperative Specification Development," Department of Computer Science, Tokyo Institute of Technology, Nov. 15, 1995, pp. 232-247.

Barriot, E., "From Standalone Voice Processing Applications to Call Center Solutions", Alcatel Telecommunications Review, 1995, pp. 52-57.

Lamotte, J., "Getting the Most Out of Mail-Enabled Applications", Managing Office Technology, vol. 39, No. 4, Mar. 1994, p. 73.

"U.S. Appl. No. 08/695,095, Advisory Action mailed Feb. 19, 1999", 3 pgs.

"U.S. Appl. No. 08/695,095, Final Office Action mailed Aug. 28, 1998", 8 pgs.

"U.S. Appl. No. 08/695,095, Non-Final Office Action mailed Mar. 20, 1998", 6 pgs.

"U.S. Appl. No. 08/695,095, Non-Final Office Action mailed Apr. 9, 1999", 4 pgs.

"U.S. Appl. No. 08/695,095, Response filed Jan. 8, 1999 to Final office action mailed Aug. 28, 1998", 15 pgs.

"U.S. Appl. No. 08/695,095, Response filed Jun. 15, 1998 To Non-Final Office Action mailed Mar. 20, 1998", 7 pgs.

"U.S. Appl. No. 08/725,635, Advisory Action mailed Feb. 11, 1999", 3 pgs.

"U.S. Appl. No. 08/725,635, Examiner Interview Summary mailed Jan. 6, 1999", 1 pg.

"U.S. Appl. No. 08/725,635, Final Office Action mailed Aug. 28, 1998", 8 pgs.

"U.S. Appl. No. 08/725,635, Non-Final Office Action Apr. 9,1999", 4 pgs.

"U.S. Appl. No. 08/725,635, Non-Final Office Action mailed Apr. 15, 1998", 7 pgs.

"U.S. Appl. No. 08/725,635, Notice of Allowance mailed Aug. 13, 1999", 4 pgs.

"U.S. Appl. No. 08/725,635, Response filed Jan. 8, 1999 to Final Office Action mailed Aug. 28, 1998", 15 pgs.

"U.S. Appl. No. 08/725,635, Response filed Jun. 15, 1998 to Non-Final Office Action mailed Apr. 15, 1998", 6 pgs.

"U.S. Appl. No. 08/725,635, Response filed Jul. 13, 1999 to Non-Final Office Action mailed Apr. 9, 1999", 3 pgs.

"U.S. Appl. No. 09/426,573, Final Office Action mailed Feb. 12, 2002", 7 pgs.

"U.S. Appl. No. 09/426,573, Final Office Action mailed Apr. 22, 2003", 9 pgs.

"U.S. Appl. No. 09/426,573, Non-Final Office Action mailed Jan. 9, 2004", 7 pgs.

"U.S. Appl. No. 09/426,573, Non-Final Office Action mailed Jul. 26, 2001", 8 pgs.

"U.S. Appl. No. 09/426,573, Non-Final Office Action mailed Aug. 12, 2004", 7 pgs.

"U.S. Appl. No. 09/426,573, Non-Final Office Action mailed Oct. 28, 2002", 6 pgs.

"U.S. Appl. No. 09/426,573, Notice of Allowance mailed Jul. 28, 2006", 9 pgs.

"U.S. Appl. No. 09/426,573, Notice of Allowance mailed Oct. 4, 2005", 12 pgs.

"U.S. Appl. No. 09/426,573, Preliminary Amendment mailed Aug. 15, 2003", 6 pgs.

"U.S. Appl. No. 09/426,573, Response filed Jan. 15, 2002 to Non-Final Office Action mailed Jul. 26, 2001", 9 pgs.

"U.S. Appl. No. 09/426,573, Response filed Jan. 28, 2003 to Non-Final Office Action mailed Oct. 28, 2002", 7 pgs.

"U.S. Appl. No. 09/426,573, Response filed Apr. 9, 2004 to Non-Final Office Action mailed Jan. 9, 2004", 7 pgs.

"U.S. Appl. No. 09/426,573, Response filed Dec. 9, 2004 to Non-Final Office Action mailed Aug. 12, 2004", 9 pgs.

"U.S. Appl. No. 10/371,296, Comments on Statement for Reasons on Allowance filed Sep. 18, 2006", 1 pg.

"U.S. Appl. No. 10/371,296, Final Office Action mailed Feb. 28, 2005", 11 pgs.

"U.S. Appl. No. 10/371,296, Final Office Action mailed Aug. 10, 2004", 13 pgs.

"U.S. Appl. No. 10/371,296, Non-Final Office Action mailed Jan. 16, 2004", 13 pgs.

"U.S. Appl. No. 10/371,296, Non-Final Office Action mailed Sep. 30, 2005", 5 pgs.

"U.S. Appl. No. 10/371,296, Notice of Allowance mailed Apr. 3, 2006", 11 pgs.

"U.S. Appl. No. 10/371,296, Notice of Allowance mailed Aug. 15, 2006", 9 pgs.

"U.S. Appl. No. 10/371,296, Response file Apr. 15, 2004 to Non-Final Office Action mailed Jan. 16, 2004", 12 pgs.

"U.S. Appl. No. 10/371,296, Response file May 4, 2005 to Final Office Action mailed Feb. 28, 2005", 11 pgs.

"U.S. Appl. No. 10/371,296, Response filed Dec. 23, 2005 to Non-Final Office Action mailed Sep. 30, 2005", 10 pgs.

"U.S. Appl. No. 10/371,536, Non-Final Office Action mailed Jan. 16, 2004", 17 pgs.

"U.S. Appl. No. 10/371,536, Notice of Allowance mailed Oct. 4, 2004", 10 pgs.

"U.S. Appl. No. 10/371,536, Response filed Jun. 9, 2004", 14 pgs.

"U.S. Appl. No. 10/877,727, Non-Final Office Action mailed Jun. 5, 2007", 10 pgs.

"U.S. Appl. No. 10/877,727, Response filed Dec. 5, 2007 to Non-Final Office Action mailed Jun. 5, 2007", 16 pgs.

"U.S. Appl. No. 10/877,727, Restriction Requirement mailed Dec. 5, 2006", 7 pgs.

"U.S. Appl. No. 10/877,727, Final Office Action mailed Mar. 6, 2008", 10 Pgs.

"U.S. Appl. No. 11/042,851, Non-Final Office Action mailed Jan. 3, 2008", 4 pgs.

"U.S. Appl. No. 11/042,851, Preliminary Amendment mailed Jan. 25, 2005", 7 pgs.

"U.S. Appl. No. 11/042,851, Response filed Mar. 17, 2008 to Non-Final Office Action mailed Jan. 3, 2008", 7 pgs.

"International Application Serial No. PCT/US97/13567, Written Opinion mailed Apr. 15, 1998", 8 pgs.

"International Application Serial No. PCT/US97/13567, Written Opinion mailed Jul. 29, 1998", 6 pgs.

"International Application Serial No. 2263903, Non-Final Office Action mailed May 26, 2004", 7 pgs.

"International Application Serial No. 2263903, Non-Final Office Action mailed Sep. 15, 2003", 5 pgs.

"International Application Serial No. 2263903, Non-Final Office Action mailed Nov. 28, 2005", 6 pgs.

"International Application Serial No. 2263903, Response filed Mar. 12, 2004 Non-Final Office Action mailed Sep. 15, 2003", 11 pgs.

"International Application Serial No. 97936357.9, Non-Final Office Action mailed Jan. 8, 2005", 5 pgs.

U.S. Appl. No. 11/042,851 Final Office Action mailed Jul. 11, 2008, FOAR, 10 pgs.

International Application Serial No. PCT/US2004/020502, International Search Report and Written Opinion mailed Jul. 7, 2008, p. 237, 11 pgs.

Mayer, C., "The Washington Post", *Visa settles Suit Over Debit Cards: Firm To Lower Fees, Pay Stores $2 Billion,* (May 012003), E.01.

Teixeira, D., "As Issuers Gather Addresses, Their E-mail Usage Will Grow", *American banker,* vol. 168, Iss 15, (Jan. 23, 2003), 13 pgs.

U.S. Appl. No. 10/877,727, Response filed Mar. 5, 2007 to Restriction Requirement mailed Dec. 5, 2006, 8 pgs.

U.S. Appl. No. 10/877,727, Response filed Sep. 8, 2008 to Final Office Action mailed Mar. 6, 2008, 12 pgs.

U.S. Appl. No. 10/877,727 Non-Final Office Action mailed Oct. 20, 2008, 9 pgs.

U.S. Appl. No. 11/0452,851, Non-Final Office Action mailed Mar. 2, 2009, 10 pgs.

U.S. Appl. No. 11/042,851, Notice of Allowance mailed Oct. 7, 2008, 12 pgs.

* cited by examiner

METHOD, SYSTEM AND APPARATUS FOR REQUESTING STATUS INFORMATION FROM A COMMON CARRIER

CROSS-REFERENCE TO RELATED APPLICATIONS

This application is a continuation of U.S. application Ser. No. 09/426,573, filed Oct. 25, 1999 now U.S. Pat. No. 7,139,726, which is a continuation of U.S. application Ser. No. 08/725,635, filed Oct. 8, 1996, now issued U.S. Pat. No. 6,047,264, which is a continuation-in-part of U.S. patent application Ser. No. 08/695,095, filed Aug. 8, 1996, now abandoned.

This application is related to patent application Ser. no. 10/371,296, entitled "Method and System for Providing Order Status Information Using a Network Address," filed Feb. 14, 2003 and patent application Ser. No. 10/371,536, entitled "Method and System for Providing Order Status Information Using an Update Status Flag," filed Feb. 14, 2003, each commonly assigned with the present invention.

BACKGROUND OF THE INVENTION

1. Field of the Invention

The present invention relates generally to electronic commerce and more particularly to updating customers as to the status of their orders and order shipments.

2. Description of the Related Art

In the mail order industry, it is common practice to notify customers by mail when their orders are backlogged or their shipments will be delayed for some reason. The advent of wide area electronic networks like the Internet has made it possible for customers to query the status of their orders and shipments by directly accessing the merchants' and shippers' information systems. For example, both Federal Express® (FedEx®) and United Parcel Service® (UPS®) have world wide web sites on the Internet where customers can track the shipping status of their packages by simply inputting the package's tracking number to a computer form on a web page.

There is an advantage however, to notifying customers by mail when their shipments will be delayed, because the customer is not required to take any action to receive this notification—that is, the customer does not have to proactively access the Internet or other network, go to the shipper's world wide web site, and obtain and input a parcel tracking number in order to check on the shipping status.

In U.S. Pat. No. 5,428,778 to Brookes ("Brookes"), a keyword based profile is used to match information coming into a system with the users' interests. In Brookes, the user is alerted to the presence of the information in the database (perhaps because there is a delivery fee associated with the information), but the information is not actually delivered to the user.

Also in the related art are several Internet-based electronic mail systems that deliver information to users daily via E-mail based on personal profiles. There are, for example, several stock quotation services that electronically mail a list of a user's personal favorite stock prices each day. Unlike Brookes, such systems do deliver the information directly to the user. However, the user is required to submit an interest profile to the system in order to receive feedback.

There is a need in the art, therefore, for a system and method for automatically notifying a party of the status of a delivery without requiring submission of a status request or special profile information from the party.

SUMMARY OF THE INVENTION

A method and system for requesting status information from a common carrier is described. According to one aspect of the invention, transit status information is automatically requested from a common carrier information system over a network. The transit status information indicates a transit status of an item purchased by a customer by placing an order. A message is automatically composed and transmitted to the customer upon determining the transit status of the item purchased by the customer has changed.

DESCRIPTION OF THE DRAWINGS

The aforementioned advantages of the invention, as well as additional advantages thereof, will be more fully understood as a result of a detailed description of the exemplary embodiment when taken in conjunction with the accompanying drawings in which.

DETAILED DESCRIPTION OF AN EXEMPLARY EMBODIMENT

Figure 1:
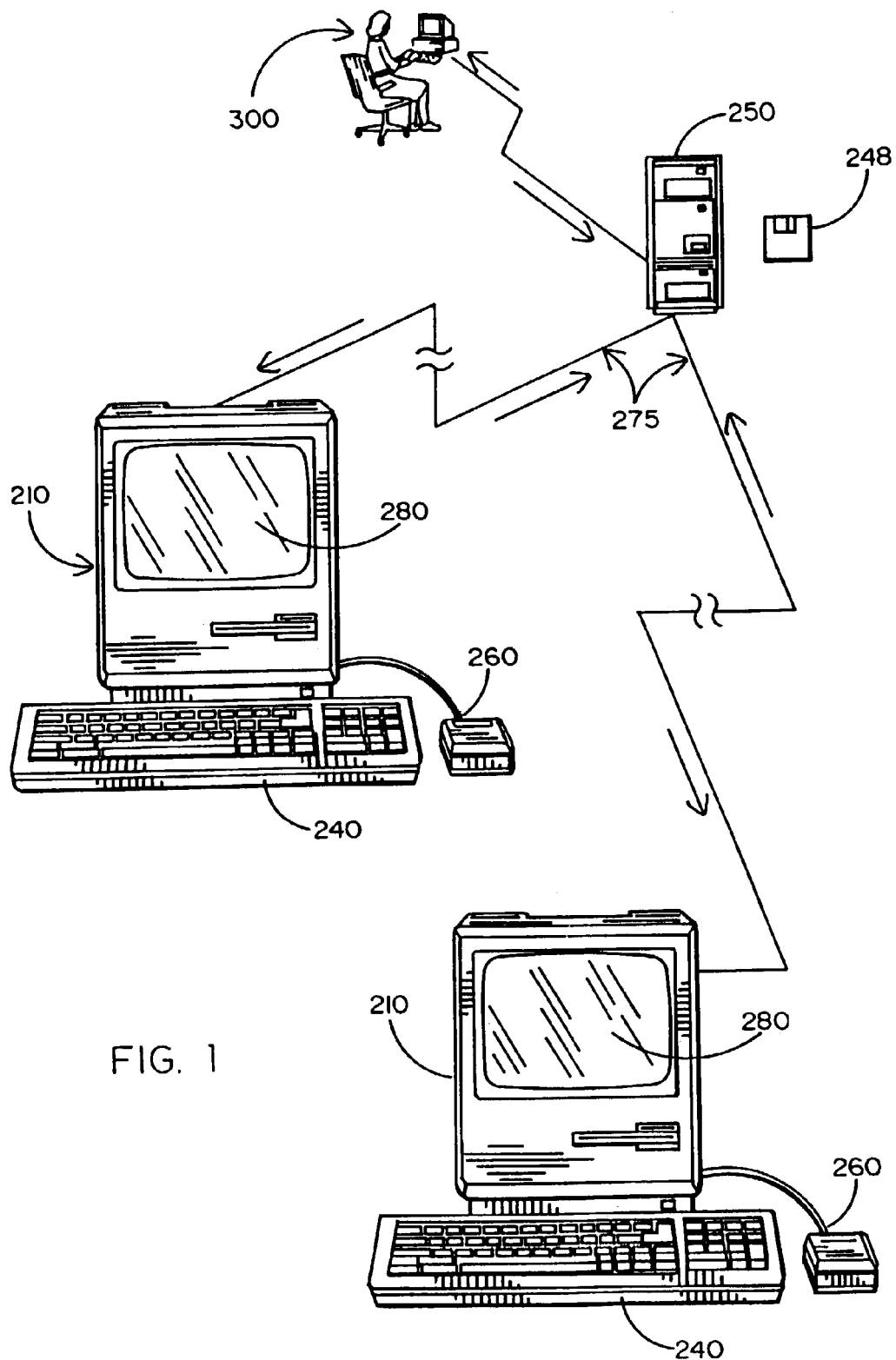
FIG. 1 illustrates an exemplary computer environment for implementing the system and method of the present invention.

The present invention may be implemented as a computer program 248 running on a central server host computer shown in FIG. 1, attached to a wide area network 275 accessible by many potential customers through remote terminals 210 using keyboard 240, pointing device 260 and monitor 280. An exemplary network for implementing the present invention is the Internet, which is accessible by a significant percentage of the world population, although the network may also be a local area or limited area accessible network.

Figure 2:
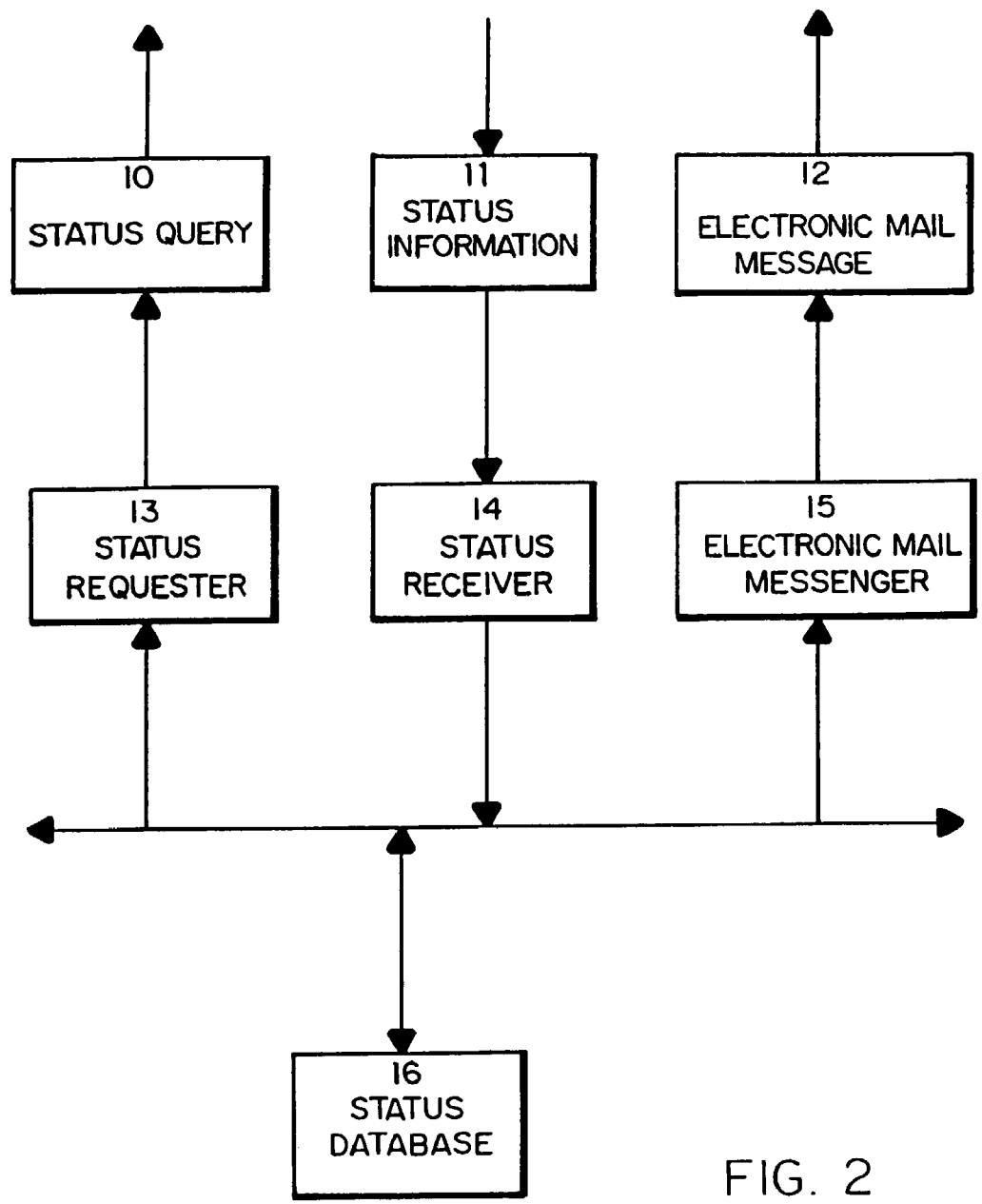
FIG. 2 is block diagram of components illustrating an exemplary embodiment of the present invention.

Information about the customers and their respective orders is maintained in a status database 16 such as the one shown in FIG. 2. Status database 16 may be maintained on server 250 shown in FIG. 1. Individual customer orders may be placed in this database either by order entry personnel 300 or electronically by order entry systems also attached to wide area network 275 of FIG. 1. Status information in status database 16 may be updated manually by order entry personnel or electronically by other means such as status receiver 14 shown in FIG. 2.

Periodically via status query 10, status requester 13, sends a status request to another host computer on wide area network 275, such as a common carrier shipping service like UPS® or FedEx®. Status information 11 is returned and received by status receiver 14, which places the new status information in status database 16. When status receiver 14 updates the status in status database 16, it sets a flag on the particular database record indicating a change in status.

Periodically, electronic mail messenger 15 checks status database 16, to see if the status of any record has changed, by examining the records' status flags. If a record has been flagged, then electronic mail messenger 15 composes an electronic mail message 12 based on the new status information in status database 16. This electronic mail message 12 is transmitted to the customer over the wide area network 275.

Figure 3:
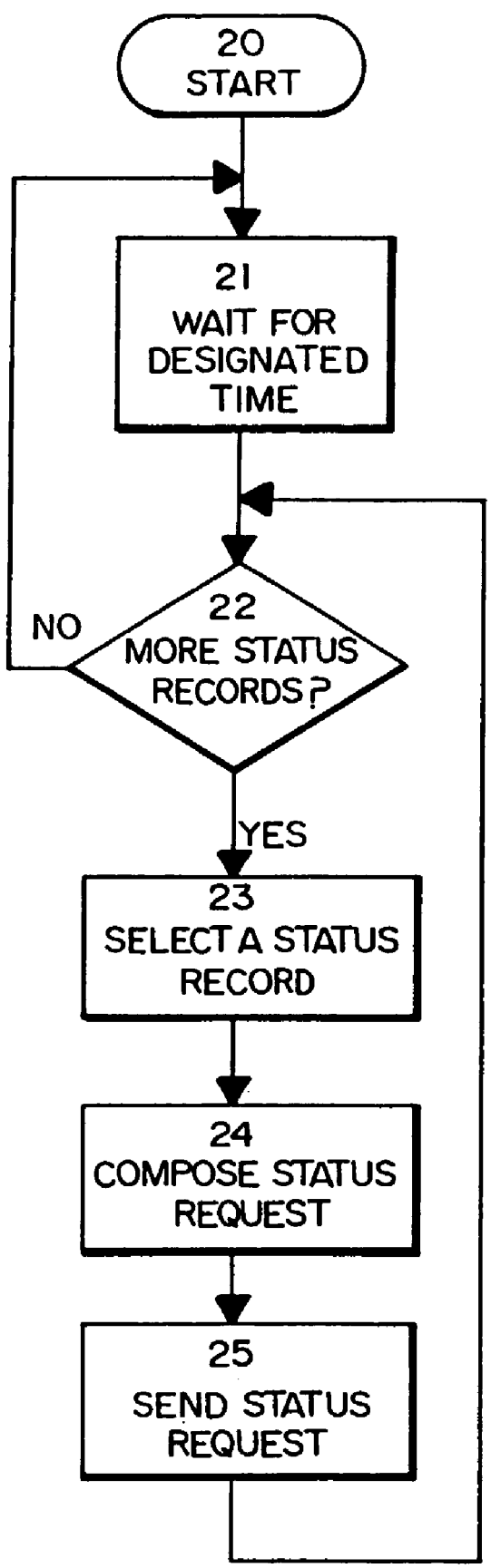
FIG. 3 is a flowchart illustrating the status requester and its method of operation.

FIG. 3 illustrates the operation of status requester 13. In an exemplary embodiment, the status requester is continually running a program that periodically requests status updates from other host computers on wide area network 275. After waiting 21 for a designated time, which for a shipping status update is preferably every six to twenty-four hours, status database 16 is checked 22 to see if there are more status records. If so, then a status record is selected 23 and a status request is composed 24. This status request is sent 25 to another host computer on wide area network 275. This requesting process continues until each of the status records in status database 16 have been checked 22.

Figure 4:
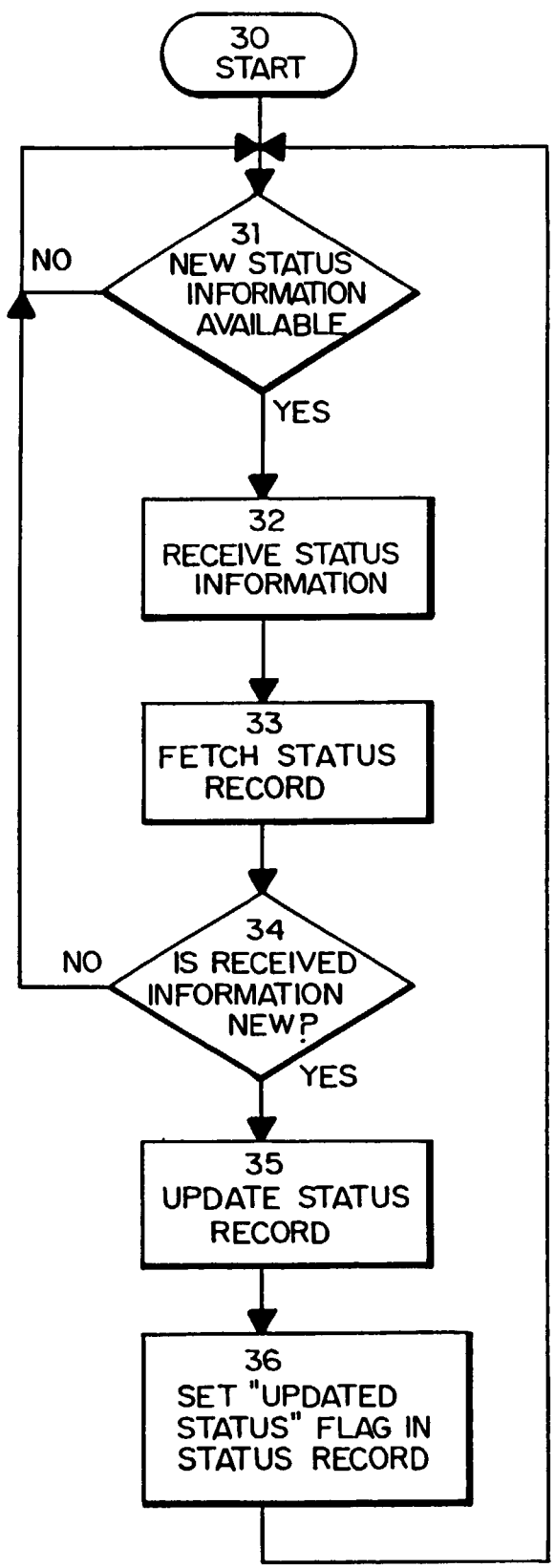
FIG. 4 is a flowchart illustrating the status receiver and its method of operation.

FIG. 4 illustrates the operation of status receiver 14. In the exemplary embodiment, the status receiver is a continually running program that periodically receives status information 11 from another host computer on wide area network 275 based on requests generated by status requester 13. Wide area network 275 is continually checked for new status information 11. If new status information is found available at 31 then the status information is received 32 and the corresponding status record is fetched 33 from status database 16. The information is compared with that in the status record to determine 34 if the received information is new. If the received information is new, then the status record is updated 35 in status database 16 and the Updated Status flag is set 36 in the status record.

Figure 5:
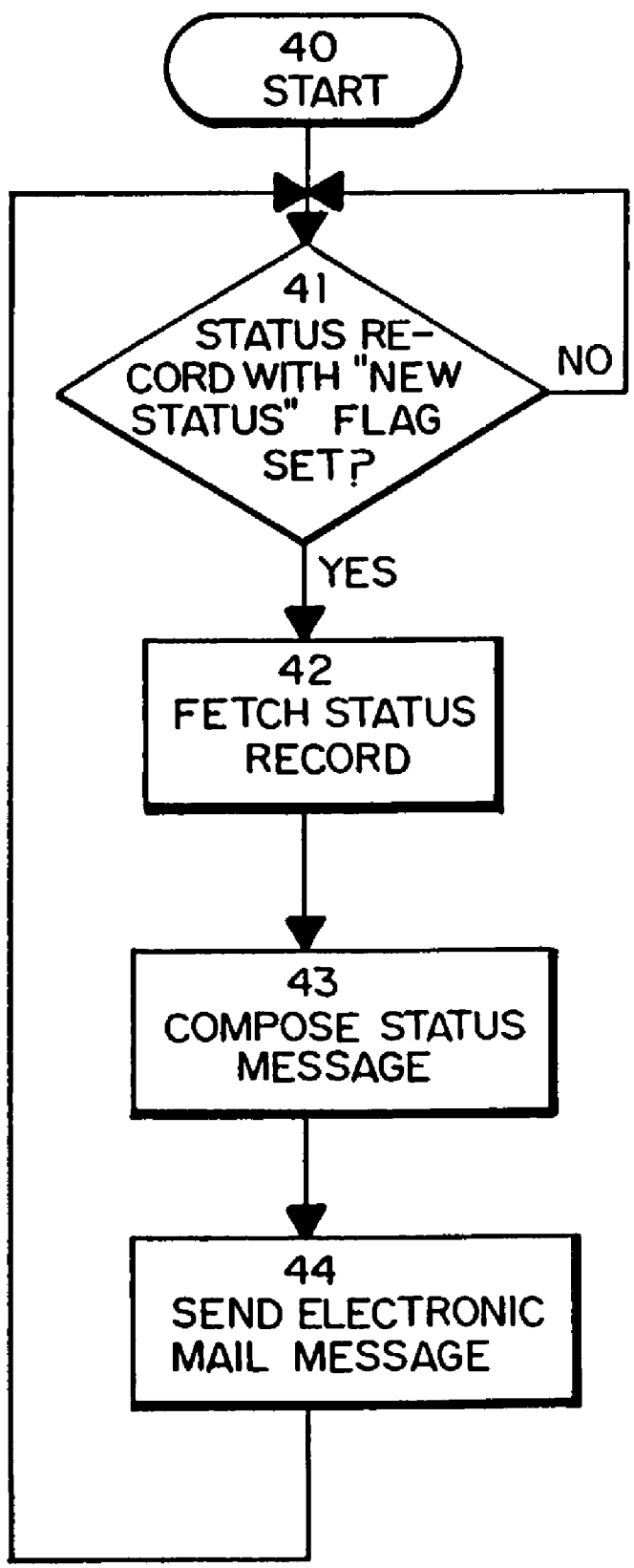
FIG. 5 is a flowchart illustrating the electronic mail messenger and its method or operation.

FIG. 5 illustrates the operation of electronic mail messenger 15. In an exemplary embodiment, the electronic mail messenger is a continually running program that periodically checks 41 status database 16 to see if any records have an "Updated Status" flag set. If so, the appropriate status record is fetched 42 from status database 16 and an electronic mail message is composed 43 regarding the new status information. This electronic mail message is then preferably sent 44 to the recipient over wide area network 275.

One skilled in the art to which the present invention pertains will recognize that the various components of the system may communicate between themselves in a variety of ways. In an exemplary embodiment, status receiver 14 signals electronic mail messenger 15 via an "Updated Status" flag in the appropriate database records that a new update message should be sent. However, status receiver 14 could directly communicate with electronic mail messenger 15 to send a status update message without setting a signaling flag in status database 16 and awaiting discovery of such a flag by the electronic mail messenger.

One skilled in the art to which the present invention pertains will further recognize that components of status requester 13 and status receiver 14 may be combined into a single module that communicates with a remote host computer in a synchronous fashion. For example, the status requester portion of the combined module could send a status request to the remote host computer and wait for the status information to be received before proceeding to submit the next status request to the remote host computer. This type of synchronous operation is quite common in electronic data interchange applications.

The present invention may be implemented as a software program on a host computer such as 250 in FIG. 1 within a network 275 such as the Internet. The program may be loaded onto computer 250 from disk 248 or a similar storage medium.

A general description of the present invention as well as an exemplary embodiment of the present invention has been set forth above. Those skilled in the art to which the present invention pertains will recognize and be able to practice additional variations to the methods and system described within the teachings of this invention. Accordingly, all such modifications and additions are deemed to be within the scope of the invention, which is to be limited only by the appended claims.

What is claimed is:

1. A method to provide update information, the method including:
    on a central server, automatically requesting transit status information from a common carrier information system over a network, the transit status information including information regarding a transit status of an item purchased by a customer by placing an order, while the item is in transit by a common carrier to the customer;
    storing the transit status information in a status record;
    periodically determining whether the received transit status information is new relative to further transit status information pertaining to the order stored within the status record; and
    automatically composing and transmitting an email to the customer upon determining the transit status of the item purchased by the customer has changed.

2. The method of claim 1, further including:
    receiving an electronic mail address from the customer when the customer places an order for the item purchased.

3. The method of claim 1, further including:
    when the received transit status information is new, updating the status record to include the received transit status information.

4. The method of claim 3, wherein updating the status record includes setting a flag associated with the status record, and wherein the composing and transmitting of the message includes performing a check to see if the flag associated with the status record is set and transmitting the message if the flag is set.

5. The method of claim 1, further including:
    automatically composing and transmitting the message when the item leaves a distribution center of the common carrier.

6. The method of claim 1, further including:
    automatically composing and transmitting the message when the item reaches a distribution terminal for transfer to another truck.

7. The method of claim 1, further including:
    automatically composing and transmitting the message when the item reaches a distribution terminal for transfer to another form of carriage.

8. The method of claim 1, further including:
    automatically composing and transmitting the message when the item is received at the location of the customer.

9. The method of claim 1, wherein the message includes the current or approximate physical location of the item once the item is in transit.

10. The method of claim 1, wherein the transit status information includes a location of the item.

11. The method of claim 1, wherein the message is an electronic mail message.

12. The method of claim 1, wherein the composing the message is performed upon determining whether the transit status information of the item has been updated.

13. An electronic commerce system, comprising:
    a host computer; and a storage medium having instructions, which when executed by the computer cause the performing of operations, comprising:
  automatically requesting transit status information from a common carrier information system over a network, the transit status information including information regarding a transit status of an item purchased by a customer by placing an order, while the item is in transit by a common carrier to the customer;
  storing the transit status information in a status record;
  periodically determining whether the received transit status information is new relative to further transit status information pertaining to the order stored within the status record; and
  automatically composing and transmitting an email message to the customer upon determining that the transit status of the item purchased by the customer has changed.

14. The system of claim 13, wherein the operations performed by the execution of the instructions further comprise when the transit status information is new, updating the status record to include the new transit status information.

15. The system of claim 13, wherein the operations performed by the execution of the instructions further comprise:
  receiving the transit status information from a common carrier.

16. The system of claim 15, wherein the operations performed by the execution of the instructions further comprise updating a status record by setting a flag associated with the status record.

17. The system of claim 13, wherein the operations performed by the execution of the instructions further comprise composing and transmitting the message when the item reaches a distribution terminal for transfer to another truck.

18. The system of claim 13, wherein the operations performed by the execution of the instructions further comprise automatically composing and transmitting the message when the item leaves a distribution center of the common carrier.

19. The system of claim 13, wherein the operations performed by the execution of the instructions further comprise composing and transmitting the message when the item reaches a distribution terminal for transfer to another form of carriage.

20. The system of claim 13, wherein the operations performed by the execution of the instructions further comprise composing and transmitting the message when the item is received at a location of the customer.

21. The system of claim 13, wherein the message includes the current or approximate physical location of the item once the item is in transit.

22. The system of claim 13, wherein the transit status information includes a location of the item.

23. The system of claim 13, wherein the message is an electronic mail message.

24. A machine-readable medium having executable instructions to cause a machine to perform a method to provide update information, the method including:
  automatically requesting transit status information from a common carrier information system over a network, the transit status including information regarding a transit status of an item purchased by a customer by placing an order, while the item is in transit by a common carrier to the customer;
  storing the transit status information in a status record;
  periodically determining whether the received transit status information is new relative to further transit status information pertaining to the order stored within the status record; and
  automatically composing and transmitting an email message to the customer upon determining the transit status of the item purchased by the customer has changed.

25. The machine-readable medium of claim 24, further including:
  receiving an electronic mail address from the customer when the customer places an order for the item purchased.

26. The machine-readable medium of claim 24, further including:
  when the transit status information is new, updating the status record to include the transit status information.

27. The machine-readable medium of claim 26, wherein updating the status record includes setting a flag associated with the status record, and wherein the composing and transmitting of the message includes performing a check to see if the flag associated with the status record is set and transmitting the message if the flag is set.

* * * * *

UNITED STATES PATENT AND TRADEMARK OFFICE
CERTIFICATE OF CORRECTION

| | |
|---|---|
| PATENT NO. | : 7,596,510 B2 |
| APPLICATION NO. | : 10/371274 |
| DATED | : September 29, 2009 |
| INVENTOR(S) | : Fisher et al. |

Page 1 of 1

It is certified that error appears in the above-identified patent and that said Letters Patent is hereby corrected as shown below:

On Page 2, under "Other Publications", in column 2, line 23, delete "U.S. Appl." and insert -- U.S. Pat. --, therefor.

On Page 2, under "Other Publications", in column 2, line 38, delete "Aricle," and insert -- Article, --, therefor.

In column 2, line 15, delete "DESCRIPTION" and insert -- BRIEF DESCRIPTION --, therefor.

In column 5, line 34, in Claim 17, delete "composing" and insert -- automatically composing --, therefor.

In column 5, line 42, in Claim 19, delete "composing" and insert -- automatically composing --, therefor.

In column 6, line 3, in Claim 20, delete "composing" and insert -- automatically composing --, therefor.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,596,510 B2 Page 1 of 1
APPLICATION NO. : 10/371274
DATED : September 29, 2009
INVENTOR(S) : Fisher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1779 days.

Signed and Sealed this

Twenty-eighth Day of September, 2010

David J. Kappos
*Director of the United States Patent and Trademark Office*